United States Patent
Kim et al.

(10) Patent No.: US 11,175,717 B2
(45) Date of Patent: Nov. 16, 2021

(54) METHOD FOR REDUCING CURRENT CONSUMPTION, AND ELECTRONIC DEVICE

(71) Applicant: Samsung Electronics Co., Ltd., Gyeonggi-do (KR)

(72) Inventors: Seung Jin Kim, Gyeonggi-do (KR); Ji Hun Kim, Gyeonggi-do (KR); Gwang Hui Lee, Gyeonggi-do (KR); Sung Jun Lee, Gyeonggi-do (KR); Woo Jun Jung, Gyeonggi-do (KR); Min Jung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 439 days.

(21) Appl. No.: 16/086,084

(22) PCT Filed: Mar. 17, 2017

(86) PCT No.: PCT/KR2017/002949
§ 371 (c)(1),
(2) Date: Sep. 18, 2018

(87) PCT Pub. No.: WO2017/175989
PCT Pub. Date: Oct. 12, 2017

(65) Prior Publication Data
US 2020/0293104 A1    Sep. 17, 2020

(30) Foreign Application Priority Data
Apr. 5, 2016  (KR) .................. 10-2016-0041887

(51) Int. Cl.
*G09G 5/36*     (2006.01)
*G06F 1/3225*   (2019.01)
(Continued)

(52) U.S. Cl.
CPC .......... *G06F 1/3225* (2013.01); *G06F 3/1438* (2013.01); *G09G 5/393* (2013.01); *G09G 5/397* (2013.01)

(58) Field of Classification Search
CPC .... G09G 5/363; G09G 2360/18; G09G 5/377; G09G 2340/12; G09G 5/395; G09G 2360/12; G06T 2207/20021; H04N 5/265
See application file for complete search history.

(56) References Cited

U.S. PATENT DOCUMENTS 7,274,370 B2    9/2007  Paquette
7,535,478 B2    5/2009  Dunton et al.
(Continued)

FOREIGN PATENT DOCUMENTS

| KR | 20100056397 | 5/2010 |
| KR | 20100117709 | 11/2010 |
| KR | 20110079523 | 7/2011 |

OTHER PUBLICATIONS

PCT/ISA/210 Search Report issued on PCT/KR2017/002949 (pp. 7).

(Continued)

*Primary Examiner* — Hau H Nguyen
(74) *Attorney, Agent, or Firm* — The Farrell Law Firm, P.C.

(57) ABSTRACT

Various examples of the present invention relate to an electronic device comprising: a graphic buffer for storing graphic information received from an application; a frame buffer for storing the graphic information to be displayed on a display; and a processor, wherein the processor is configured to: store, in the graphic buffer, first graphic information received from a first layer; store, in the frame buffer, second graphic information received from a second layer; store, in the frame buffer, the first graphic information stored in the graphic buffer; and simultaneously display the first graphic (Continued)

information and the second graphic information, stored in the frame buffer, through the display functionally connected with the processor. In addition, other examples identifiable through the specification are possible.

12 Claims, 15 Drawing Sheets

(51) Int. Cl.
  *G06F 3/14* (2006.01)
  *G09G 5/393* (2006.01)
  *G09G 5/397* (2006.01)

(56) References Cited

U.S. PATENT DOCUMENTS

| | | |
|---|---|---|
| 7,652,678 B2 | 1/2010 | Brunner et al. |
| 7,969,453 B2 | 6/2011 | Brunner et al. |
| 8,130,226 B2 | 3/2012 | Brunner et al. |
| 8,144,159 B2 | 3/2012 | Brunner et al. |
| 8,274,501 B2 | 9/2012 | Kwa et al. |
| 8,384,738 B2 | 2/2013 | Mercer |
| 8,446,415 B2 | 5/2013 | Brunner et al. |
| 8,477,143 B2 | 7/2013 | Harper et al. |
| 8,619,092 B2 | 12/2013 | Yamauchi |
| 8,743,105 B2 | 6/2014 | Kwa et al. |
| 8,760,459 B2 | 6/2014 | Hedges |
| 8,842,133 B2 | 9/2014 | Harper et al. |
| 9,110,665 B2 | 8/2015 | Kwa et al. |
| 9,116,697 B2 | 8/2015 | Kwa et al. |
| 9,141,170 B2 | 9/2015 | Kwa et al. |
| 9,881,353 B2 | 1/2018 | Harper et al. |
| 9,881,592 B2 | 1/2018 | Ryu et al. |
| 2005/0140695 A1 | 6/2005 | Dunton et al. |
| 2005/0168471 A1 | 8/2005 | Paquette |
| 2005/0285867 A1 | 12/2005 | Brunner et al. |
| 2007/0009182 A1 | 1/2007 | Yamauchi |
| 2007/0182749 A1 | 8/2007 | Brunner et al. |
| 2007/0257925 A1 | 11/2007 | Brunner et al. |
| 2008/0030504 A1 | 2/2008 | Brunner et al. |
| 2008/0284798 A1 | 11/2008 | Weybrew et al. |
| 2009/0225093 A1 | 9/2009 | Harper et al. |
| 2010/0058229 A1 | 3/2010 | Mercer |
| 2010/0123727 A1 | 5/2010 | Kwa et al. |
| 2011/0157201 A1 | 6/2011 | Hedges |
| 2011/0216079 A1 | 9/2011 | Brunner et al. |
| 2012/0188255 A1 | 7/2012 | Brunner et al. |
| 2013/0021357 A1 | 1/2013 | Kwa et al. |
| 2013/0335443 A1 | 12/2013 | Harper et al. |
| 2014/0104286 A1 | 4/2014 | Kwa et al. |
| 2014/0104290 A1 | 4/2014 | Kwa et al. |
| 2014/0111531 A1 | 4/2014 | Kwa et al. |
| 2015/0035860 A1 | 2/2015 | Harper et al. |
| 2015/0084983 A1* | 3/2015 | Croxford ............ G09G 5/14 345/619 |
| 2015/0100884 A1 | 4/2015 | Ryu et al. |

OTHER PUBLICATIONS

PCT/ISA/237 Written Opinion issued on PCT/KR2017/002949 (pp. 4).

European Search Report dated Dec. 7, 2018 issued in counterpart application No. 17779289.2-1221, 8 pages.

\* cited by examiner

| FIRST LAYER | SECOND LAYER | TYPE OF COMPOSITION TO BE PERFORMED | OCCURRENCE FREQUENCY |
|---|---|---|---|
| Queued | Queued | COMPOSITION CASE 1 PERFORMED | LOW |
| Queued | No change or Drawing | COMPOSITION CASE 2 PERFORMED | HIGH |
| No change | Queued | COMPOSITION CASE 3 PERFORMED | LOW |
| No change | No change or Drawing | COMPOSITION NOT PERFORMED | – |
| Drawing | Queued | COMPOSITION CASE 4 PERFORMED | LOW |
| Drawing | No change or Drawing | COMPOSITION NOT PERFORMED | – |

FIG.5

METHOD FOR REDUCING CURRENT CONSUMPTION, AND ELECTRONIC DEVICE

PRIORITY

This application is a National Phase Entry of PCT International Application No. PCT/KR2017/002949 which was filed on Mar. 17, 2017, and claims priority to Korean Patent Application No. 10-2016-0041887, which was filed on Apr. 5, 2016, the content of each of which is incorporated herein by reference.

TECHNICAL FIELD

Various embodiments of the present invention relate to an electronic device and a method for reducing current consumption.

BACKGROUND ART

With developments of information and communication technology, network devices such as a base station and the like are installed throughout the country. An electronic device transmits and receives data to and from another electronic device over a network, thereby allowing a user to utilize the network freely anywhere in the country.

Various kinds of the electronic devices provide a variety of functions to cope with the recent trend of the digital convergence. For example, a smartphone supports a function to connect to the Internet over the network, as well as a call function. Furthermore, the smartphone supports the following: a function of reproducing music or a video and a function of taking video and photo by using an image sensor.

To perform the above-described functions, the smartphone includes a battery that supplies electric power. Recently, with the sliminess and the lightness of the smartphone, a scheme of efficiently using the battery has been suggested.

DISCLOSURE

Technical Problem

The execution of various functions requires a lot of current consumption. Accordingly, to overcome the limitation in the capacity of a battery manufactured to satisfy an aesthetic purpose, the reduction of current consumption has been an important issue.

Various embodiments of the present invention are to provide an electronic device and a method for reducing current consumption in an application output. However, the technical problem to be solved by various embodiments of the present invention is not limited to the above problems, but there may be present another technical problem.

Technical Solution

According to various embodiments of the present invention, an electronic device may include a graphic buffer to store graphic information received from an application, a frame buffer to store graphic information to be displayed on a display, and a processor. The processor may be configured to: store, in the graphic buffer, first graphic information received from a first layer, store, in the frame buffer, second graphic information received from a second layer, store, in the frame buffer, the first graphic information stored in the graphic buffer; and simultaneously display the first graphic information and the second graphic information, which are stored in the frame buffer, through a display operatively connected with the processor.

According to various embodiments of the present invention, a method performed in an electronic device may include storing first graphic information received from a first layer in a graphic buffer, storing second graphic information received from a second layer in a frame buffer, storing, in the frame buffer, the first graphic information stored in the graphic buffer, and simultaneously displaying the first graphic information and the graphic information, which are stored in the frame buffer, through a display of the electronic device.

According to various embodiments of the present invention, a computer-readable recording medium may have a program recorded to execute a method including storing first graphic information received from a first layer in a graphic buffer, storing second graphic information received from a second layer in a frame buffer, storing, in the frame buffer, the first graphic information stored in the graphic buffer, and simultaneously displaying the first graphic information and the second graphic information, which are stored in the frame buffer, through a display of the electronic device.

Advantageous Effects

According to various embodiments of the present invention, the electronic device and the method may provide the effect of reducing current consumption in the application output by performing drawing of an image of a target application to the frame buffer instead of the graphic buffer.

DESCRIPTION OF DRAWINGS

FIG. 5 is a table illustrating composition cases based on the states of a first layer and a second layer, according to various embodiments of the present invention;

MODE FOR INVENTION

Figure 1:
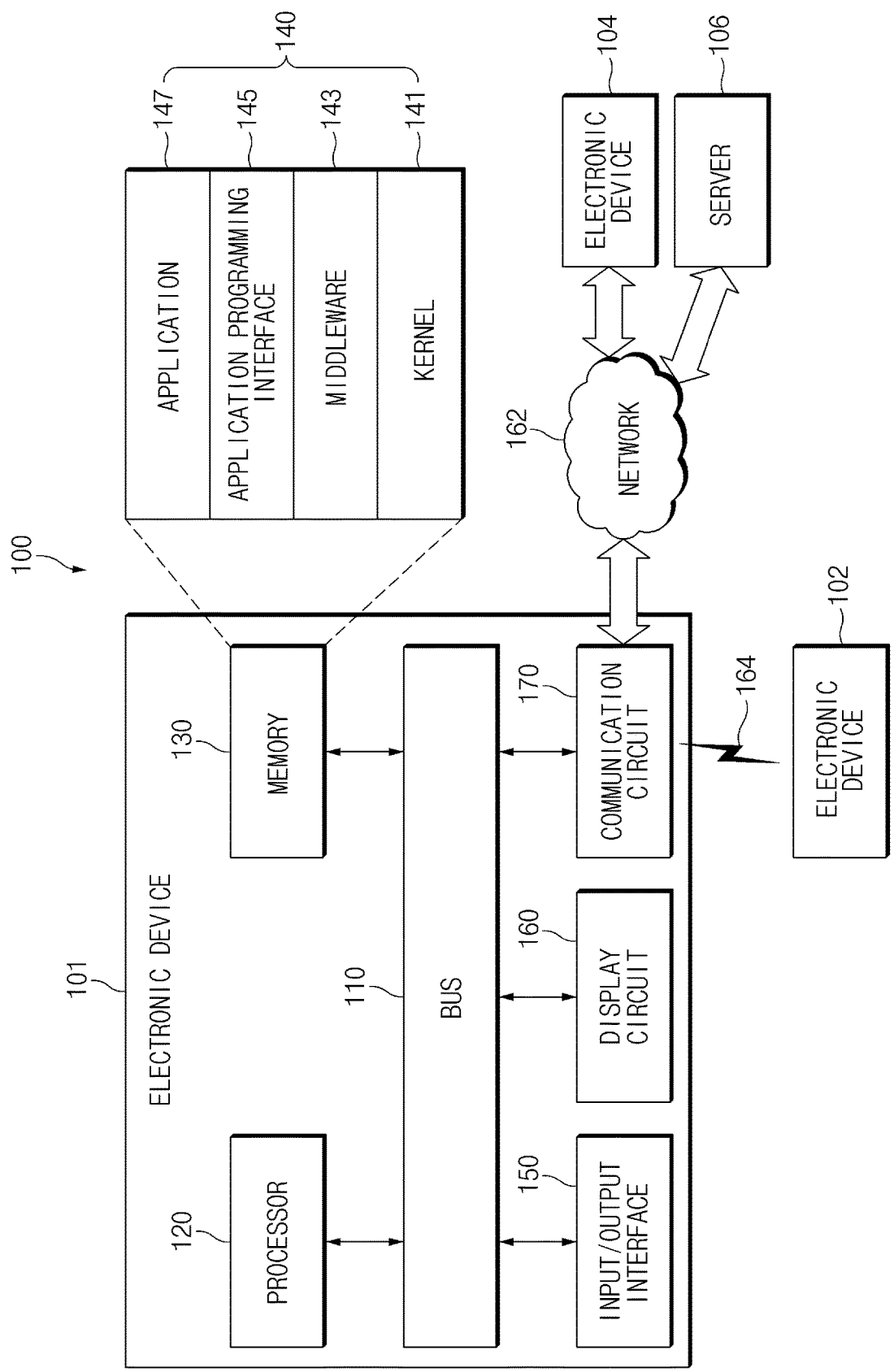
FIG. 1 is a diagram illustrating an electronic device in a network environment, according to various embodiments of the present invention.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

In the following accompanying drawings, an electronic device according to an embodiment of the present invention is assumed as a smartphone.

Referring to FIG. 1, according to various embodiments, an electronic device 100 in a network environment is described. The electronic device 100 may include a bus 110, a processor 120, a memory 130, an input/output interface 150, a display device 160, and a communication interface 170. According to an embodiment, the electronic device 100 may not include at least one of the above-described components or may further include other component(s).

For example, the bus 110 may interconnect the above-described components 110 to 170 and may include a circuit for conveying communications (e.g., a control message and/or data) among the above-described components.

The processor 120 may include one or more of a central processing unit (CPU), an application processor (AP), or a communication processor (CP). For example, the processor 120 may perform an arithmetic operation or data processing associated with control and/or communication of at least other components of the electronic device 100.

The memory 130 may include a volatile and/or nonvolatile memory. For example, the memory 130 may store commands or data associated with at least one other component(s) of the electronic device 100. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 100 so as to control or manage system resources.

The middleware 143 may perform, for example, a mediation role such that the API 145 or the application program 147 communicates with the kernel 141 to exchange data.

Furthermore, the middleware 143 may process task requests received from the application program 147 according to a priority. For example, the middleware 143 may assign the priority, which makes it possible to use a system resource (e.g., the bus 110, the processor 120, the memory 130, or the like) of the electronic device 100, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits a command or data input from a user or another external device, to other component(s) of the electronic device 100. Furthermore, the input/output interface 150 may output a command or data, received from other component(s) of the electronic device 100, to a user or another external device.

The display circuit 160 may include, for example, a liquid crystal display (LCD), a light-emitting diode (LED) display, an organic LED (OLED) display, a microelectromechanical systems (MEMS) display, or an electronic paper display. The display circuit 160 may display, for example, various contents (e.g., a text, an image, a video, an icon, a symbol, and the like) to a user. The display circuit 160 may include a touch screen and may receive, for example, a touch, gesture, proximity, or hovering input using an electronic pen or a part of a user's body.

For example, the communication circuit 170 may establish communication between the electronic device 100 and an external device (e.g., the first external electronic device 102, the second external electronic device 104, or the server 106). For example, the communication circuit 170 may be connected to the network 162 over wireless communication or wired communication to communicate with the external device (e.g., the second external electronic device 104 or the server 106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 164. The short range communication 164 may include at least one of wireless fidelity (WiFi), Bluetooth, near field communication (NFC), magnetic stripe transmission (MST), a global navigation satellite system (GNSS), or the like. The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like.

The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 100. According to an embodiment, the server 106 may include a group of one or more servers. According to various embodiments, all or a portion of operations that the electronic device 100 will perform may be executed by another or plural electronic devices (e.g., the first external electronic device 102, the second external electronic device 104 or the server 106). According to an embodiment, in the case where the electronic device 100 executes any function or service automatically or in response to a request, the electronic device 100 may not perform the function or the service internally, but, alternatively additionally, it may request at least a portion of a function associated with the electronic device 100 from another device (e.g., the first external electronic device 102, the second external electronic device 104 or the server 106). The other electronic device may execute the requested function or additional function and may transmit the execution result to the electronic device 100. The electronic device 100 may provide the requested function or service using the received result or may additionally process the received result to provide the requested function or service. To this end, for example, cloud computing, distributed computing, or client-server computing may be used.

Figure 2:
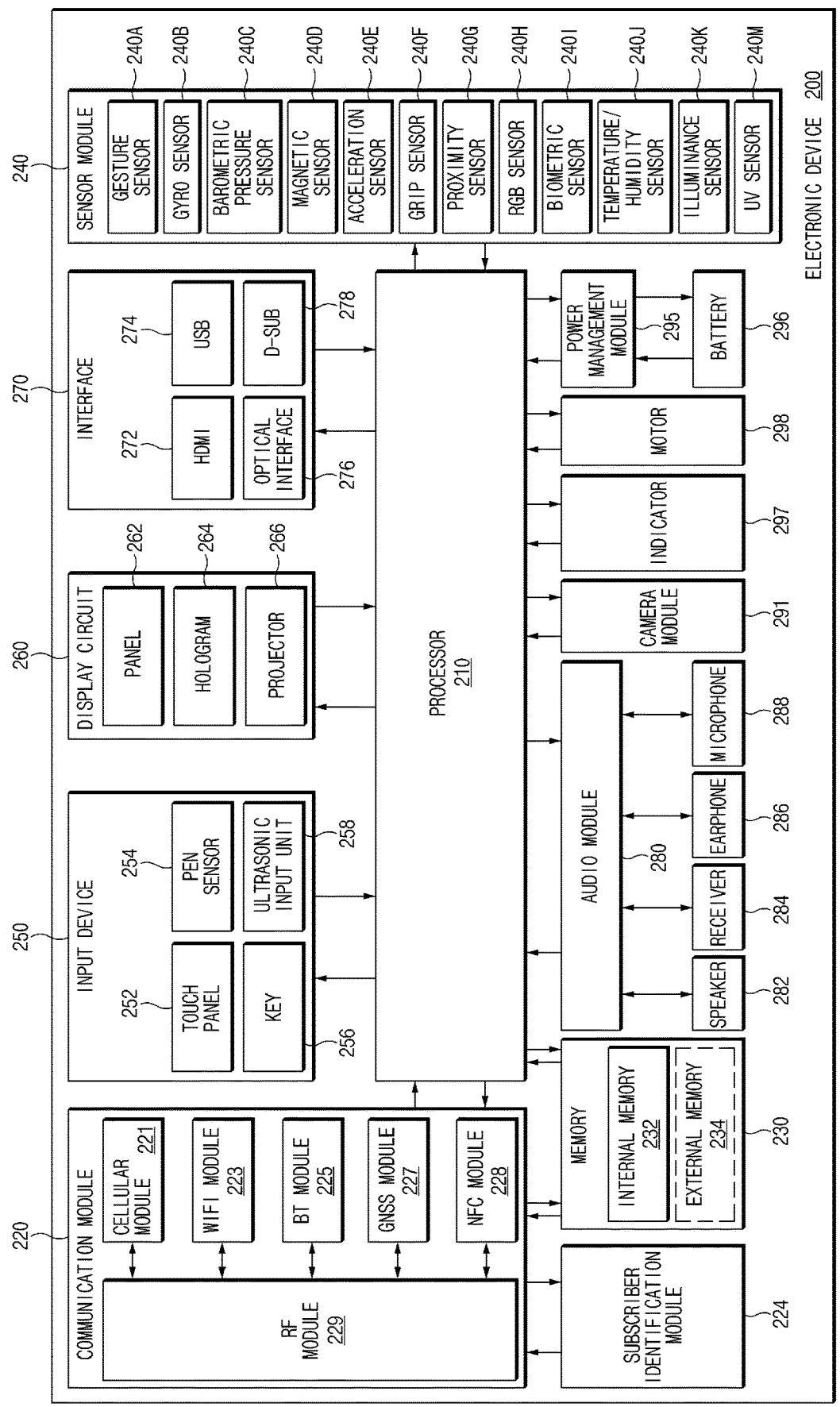
FIG. 2 is a block diagram of the electronic device, according to various embodiments of the present invention.

FIG. 2 illustrates a block diagram of an electronic device 200, according to an embodiment. The electronic device 200 may include, for example, all or a part of the electronic device 100 illustrated in FIG. 1. The electronic device 200 may include one or more processors (e.g., an application processor (AP)) 210, a communication circuit 220, a subscriber identification module 224, a memory 230, a sensor circuit 240, an input device 250, a display circuit 260, an interface 270, an audio module 280, a camera module 291, a power management module 295, a battery 296, an indicator 297, and a motor 298.

The processor 210 may drive, for example, an operating system (OS) or an application to control a plurality of hardware or software components connected to the processor 210 and may process and compute a variety of data. For example, the processor 210 may be implemented with a System on Chip (SoC). According to an embodiment, the processor 210 may further include a graphic processing unit (GPU) and/or an image signal processor. The processor 210 may include at least a part (e.g., a cellular module 221) of components illustrated in FIG. 2. The processor 210 may load a command or data, which is received from at least one of other components (e.g., a nonvolatile memory), into a volatile memory and process the loaded command or data. The processor 210 may store a variety of data in the nonvolatile memory.

The communication circuit 220 may be configured the same as or similar to the communication circuit 170 of FIG. 1. The communication circuit 220 may include the cellular module 221, a WiFi module 223, a Bluetooth (BT) module 225, a GNSS module 227 (e.g., a GPS module, a Glonass module, a Beidou module, or a Galileo module), a near field communication (NFC) module 228, and a radio frequency (RF) module 229.

The cellular module 221 may provide, for example, voice communication, video communication, a character service, an Internet service, or the like over a communication network. According to an embodiment, the cellular module 221 may perform discrimination and authentication of the electronic device 200 within a communication network by using the subscriber identification module (e.g., a SIM card) 224. According to an embodiment, the cellular module 221 may perform at least a portion of functions that the processor 210 provides. According to an embodiment, the cellular module 221 may include a communication processor (CP).

Each of the WiFi module 223, the BT module 225, the GNSS module 227, or the NFC module 228 may include a processor for processing data exchanged through a corresponding module, for example. According to an embodiment, at least a part (e.g., two or more) of the cellular module 221, the WiFi module 223, the BT module 225, the GNSS module 227, or the NFC module 228 may be included within one Integrated Circuit (IC) or an IC package.

For example, the RF module 229 may transmit and receive a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the WiFi module 223, the BT module 225, the GNSS module 227, or the NFC module 228 may transmit and receive an RF signal through a separate RF module.

The subscriber identification module 224 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 200 through various interfaces.

The sensor circuit 240 may measure, for example, a physical quantity or may detect an operation state of the electronic device 200. The sensor circuit 240 may convert the measured or detected information to an electric signal. For example, the sensor circuit 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, or an UV sensor 240M. Although not illustrated, additionally or alternatively, the sensor circuit 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor circuit 240 may further include a control circuit for controlling at least one or more sensors included therein. According to an embodiment, the electronic device 200 may further include a processor that is a part of the processor 210 or independent of the processor 210 and is configured to control the sensor circuit 240. The processor may control the sensor circuit 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, or the like. The ultrasonic input device 258 may detect (or sense) an ultrasonic signal, which is generated from an input device, through a microphone (e.g., a microphone 288) and may check data corresponding to the detected ultrasonic signal.

The display circuit 260 (e.g., the display circuit 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 200. According to an embodiment, the display circuit 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the input/output interface 150 illustrated in FIG. 1. Additionally or alternatively, the interface 270 may include, for example, a mobile high definition link (MI-IL) interface, a SD card/multi-media card (MMC) interface, or an infrared data association (IrDA) standard interface.

The audio circuit 280 may convert a sound and an electric signal in dual directions. At least a component of the audio circuit 280 may be included, for example, in the input/output interface 150 illustrated in FIG. 1. The audio circuit 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED, a xenon lamp, or the like).

The power management module 295 may manage, for example, power of the electronic device 200. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 200 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 200. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 3:
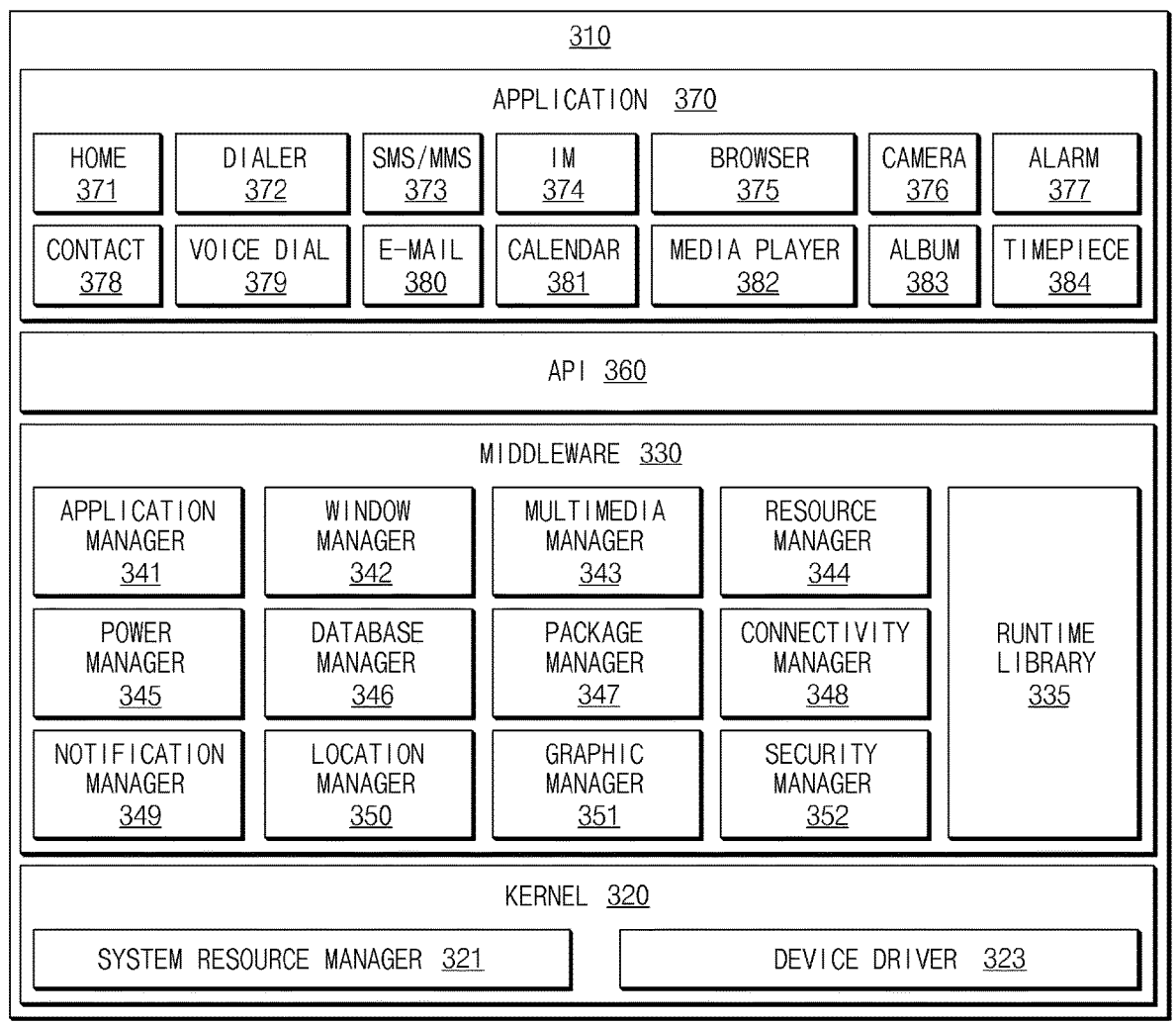
FIG. 3 is a block diagram of a program module according to various embodiments of the present invention.

FIG. 3 illustrates a block diagram of a program module, according to various embodiments. According to an embodiment, a program module 310 (e.g., the program 140) may include an operating system (OS) to control resources associated with an electronic device (e.g., the electronic device 100), and/or diverse applications (e.g., the application program 147) driven on the OS. The OS may be, for example, Android™, iOS™, Windows™, Symbian™, Tizen™, or Bada™.

The program module 310 may include a kernel 320, a middleware 330, an application programming interface (API) 360, and/or an application 370. At least a portion of the program module 310 may be preloaded on an electronic device or may be downloadable from another electronic device (e.g., the first external electronic device 102, the second external electronic device 104, the server 106, or the like).

The kernel 320 (e.g., the kernel 141) may include, for example, a system resource manager 321 or a device driver 323. The system resource manager 321 may perform control, allocation, or retrieval of system resources. According to an embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as WiFi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 100) includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting components or may add new components thereto.

The API 360 (e.g., the API 145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 370 (e.g., the application program 147) may include, for example, one or more applications capable of providing functions for a home 371, a dialer 372, an SMS/MMS 373, an instant message (1M) 374, a browser 375, a camera 376, an alarm 377, a contact 378, a voice dial 379, an e-mail 380, a calendar 381, a media player 382, an album 383, or a timepiece 384, or for offering health care (e.g., measuring an exercise quantity, blood sugar, or the like) or environment information (e.g., information of barometric pressure, humidity, temperature, or the like).

According to an embodiment, the application 370 may include an application (hereinafter referred to as "information exchanging application" for descriptive convenience) to support information exchange between an electronic device (e.g., the electronic device 100) and another electronic device (e.g., the first external electronic device 102 or the second external electronic device 104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for an SMS/MMS, e-mail, health care, or environmental information), to another electronic device (e.g., the first external electronic device 102 or the second external electronic device 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of another electronic device (e.g., the first external electronic device 102 or the second external electronic device 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of another electronic device (e.g., the first external electronic device 102 or the second external electronic device 104). According to an embodiment, the application 370 may include an application that is received from an external electronic device (e.g., the first external electronic device 102, the second external electronic device 104, or the server 106). According to an embodiment, the application 370 may include a preloaded application or a third party application that is downloadable from a server. The names of components of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

Figure 4:
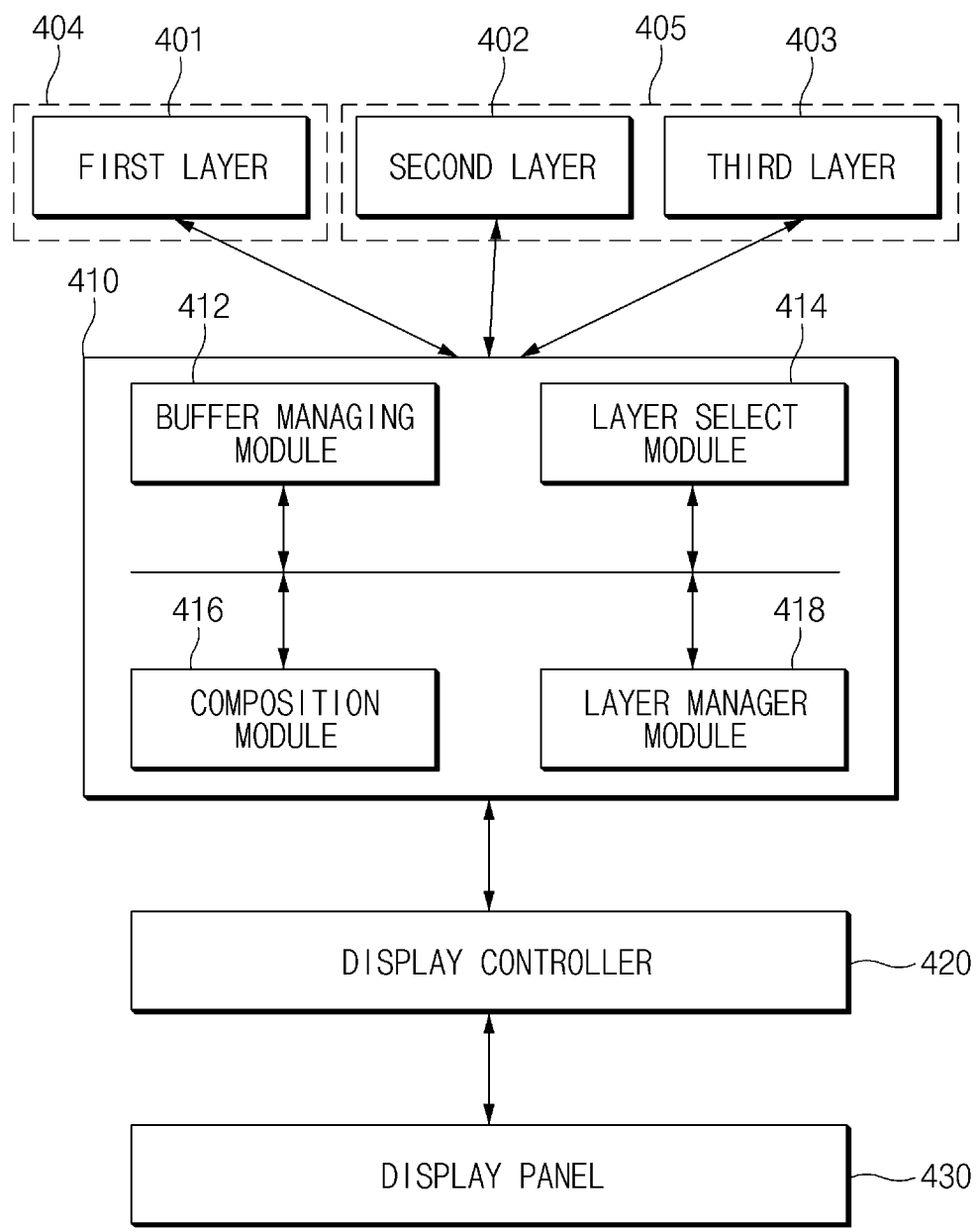
FIG. 4 is a block diagram of an electronic device, according to various embodiments of the present invention.

FIG. 4 is a block diagram of an electronic device, according to various embodiments of the present invention.

Referring to FIG. 4, an electronic device may include one or more applications (e.g., a first application 404 and a second application 405), a plurality of layers (e.g., a first layer 401, a second layer 402, and a third layer 403), a windows compositor 410, a display controller 420, and a display panel 430. According to various embodiments of the present invention, the first layer 401 may be included in the first application 404 or may be generated to correspond to the first application 404, and the second layer 402 and the third layer 403 may be included in the second application 405 or may be generated to correspond to the second application 405. According to an embodiment, layers (e.g., the first layer 401 to the third layer 403) may be included in the outside (e.g., the windows compositor 410) of applications (e.g., the first application 404 and the second application 405). In addition, the windows compositor 410 may include a buffer managing module 412, a layer select module 414, a composition module 416, and a layer manager module 418. According to various embodiments of the present invention, the plurality of applications 404 and 405, the plurality of layers 401, 402, and 403, the windows compositor 410, the display controller 420, and the display panel 430 may be operated by a processor (e.g., the processor 120 of FIG. 1).

According to various embodiments of the present invention, the windows compositor 410 may be used as the term referring to the composition module 416 based on the type of the framework (or operating system). For example, the buffer managing module 412 or the layer select module 414 may be disposed on the outside of the windows compositor 410. According to various embodiments, the plurality of modules 410, 412, 414, 416, and 418 may be implemented to be integrated into one module or implemented to be separated from each other in the form of multiple modules. For example, the composition module 416 and the layer manager module 418 may be implemented into one module (e.g., a surface flinger).

Conventionally, an electronic device may compose one image from a plurality of images, which are created (drawn) by at least one application in the graphic buffer, through a compositing module and may store the composted image in a specified region (e.g., a frame buffer) of a memory. In this case, the composition performed by the composition module may refer to an operation of copying an image, which is stored in the graphic buffer, into the frame buffer. The electronic device may output the image, which is stored in the specified region, on a display panel through the display controller.

When an application (e.g., the first application 404 or the second application 405) is executed by the electronic device, the application may request a framework (e.g., the windows compositor 410) to allocate a partial region of a screen in which an application image is to be drawn. The framework (e.g., the windows compositor 410) may allocate the partial region of the screen in response to the request of each application and may manage information (e.g., a layer) on the allocated partial region.

The layer refers to information for managing a screen region (e.g., a layer region or a surface region) corresponding to an application. For example, the layer that is an object or instance corresponding to a specified data structure may be created and deleted by an application request. According to an embodiment, the layer may include information on an address of a graphic buffer, in which an application will draw an image, a frame region (a location occupied by the layer in the whole region of the frame buffer), alpha information, z information, or the like. The term "layer" used in this specification is not limited to a specific term, but another term (e.g., a surface and a window) may be used instead of the layer. FIG. 4 illustrates the first layer 401, which is created to correspond to a first application, and the second layer 402 and the third layer 403, which are created to correspond to a second application, according to an embodiment. Although FIG. 4 illustrates layers are disposed in applications, according to various embodiments, a substance of a layer may be located in a different module such as the windows compositor 410.

The layer manager module 418 (e.g., a processor) may manage at least one layer created by applications. For example, the layer manager module 418 may create or delete a layer in response to requests of the applications and may manage at least one layer by using a list.

According to an embodiment, when an application is executed, the layer manager module 418 (e.g., the processor) may create at least one layer corresponding to the application. According to an embodiment, when the application changes a screen configuration, the layer manager module 418 may change layer information corresponding to the change in the screen configuration. For example, in the case of a map application, the layer manager module 418 may create a layer to provide map data and a menu layer used in the map application. Also, the layer manager module 418 may create a status bar layer to be displayed on the display panel 430 together with the map application. In addition, when a notification occurs during the execution of an application, the layer manager module 418 may further create a layer for the notification.

According to various embodiments of the present invention, the application may include an application to be executed through an application icon and a launcher application including the application icon. During the execution of the launcher application, the layer manager module 418 may create a launcher layer, a wallpaper layer, and a status bar layer.

According to various embodiments of the present invention, an application (or a layer) may request the buffer managing module 412 to allocate a buffer and may be allocated with the buffer. For example, the application (or the layer) may be allocated with the buffer from the buffer managing module 412 in a dequeueBuffer scheme. The buffer may be a buffer which has been allocated to the buffer managing module 412 by a kernel (e.g., the kernel 320 of FIG. 3). The buffer may be allocated to each layer. For example, a buffer which corresponds to the second layer 402 of the second application 405 and a buffer which corresponds to the third layer 403 of the second application 405 may be allocated independently from each other.

According to various embodiments of the present invention, when a buffer for a layer is requested (dequeued), the buffer managing module 412 may determine whether the layer requesting for the buffer is a target layer. The target layer may be, for example, a layer associated with an image to be directly transmitted to the frame buffer without passing through the graphic buffer. Whether the layer is the target layer may be determined by the layer select module 414. According to various embodiments of the present invention, the layer select module 414 may determine whether a layer managed by the layer manager module 418 is the target layer or not. According to an embodiment, the layer select module 414 may determine the target layer based on at least one of an update frequency of an image (e.g., an image drawn in a buffer by the application), the size of the image, the size of the requested buffer, whether the layer belongs to a preset target layer list, whether layers (images associated with the layers) are overlapped with each other, and a z-order. For example, the layer select module 414 may determine, as the target layer, a layer having an update frequency of an image, which is equal to or higher than a specified frequency, a layer requesting a buffer having the size equal to or less than the size of a frame buffer, a layer having an image in size equal to or greater than a specified size, a layer (or an image) not overlapped with another layer (or another image), or a layer having the lowest z-order. The layer select module 414 may determine whether the layer is the target layer, repeatedly at a specified period. In other words, whether a specific layer is the target layer is changed with time. For example, if the update frequency of the image associated with the layer, which has not been determined as the target layer, is equal to or greater than the specific frequency, the layer may be determined as the target layer. According to various embodiments, the layer select module 414 may not select any target layer or may select one or more target layers depending on the above-described policies. Layers not selected as target layers may be classified as non-target layers.

According to an embodiment, if a layer is a target layer, the buffer managing module 412 may allocate at least a partial region of a frame buffer to the layer. If the layer is not the target layer, the buffer managing module 412 may allocate a graphic buffer, which is created by the buffer managing module 412 (e.g., which is allocated from a buffer queue), to the layer. In other words, even if the application or the layer requests the graphic buffer, if the layer is the target layer, the frame buffer may be allocated to the layer.

According to an embodiment, the buffer managing module 412 may create and manage a graphic buffer. An application or a layer may request (dequeue) a buffer from the buffer managing module 412. If the layer, which has requested the buffer, is not the target layer, the buffer managing module 412 may allocate the graphic buffer to the layer, or may create and allocate a graphic buffer to the layer. The buffer managing module 412 may allocate a plurality of graphic buffers to one layer in a multiple buffering scheme (e.g., a double buffering or triple buffering scheme). The buffer managing module 412 may alternately use a plurality of buffers allocated to one layer in, for example, a flip scheme, in the period of vsync.

The application may draw an image in a buffer (e.g., a graphic buffer or a frame buffer) allocated to a layer. Drawing may be an operation of transmitting (writing) image data to the buffer. The image may be an image to be provided through the display panel 430 by the application. According to an embodiment, the image may be drawn in the buffer based on coordinates of a region, which is occupied by the layer, of a full frame region. For example, when the frame region of the specific layer has coordinates, in which x start=0, x end=800, y start=25, y end=1280, based on the resolution of 800*1280, the application may draw the final image, which is to be displayed at the coordinates, in the allocated buffer.

The application (or the layer) may transmit information (e.g., coordinate information) on the buffer having the image drawn therein to the buffer managing module 412. The buffer managing module 412 may store the image drawn in the region of the buffer as being in a standby state for composition. The application or the layer may transmit an output request (queue) to the buffer managing module 412. The buffer managing module 412 may manage the relevant graphic buffer as being in the composition standby state, in response to a graphic buffer output request.

The composition module 416 may integrally manage, with respect to each layer, an address of a graphic buffer having image-related information finally created by an application (or layer), a frame region (a region, which is occupied by the layer, of the entire region of the frame buffer), and the like.

When a frame rate is 60 Hz, the composition module 416 may be triggered in response to "vsync" generated every 16.6 ms and may determine whether there is present a graphic buffer in the composition standby state. If there is absent the graphic buffer in the composition standby state, the composition module 416 enters a sleep state until next "vync" and may perform composition when there is present the graphic buffer in the composition standby state. The composition module 416 may use a two dimension (2D) or three dimension (3D) graphic library to perform the composition. The graphic library may include, for example, OpenGL ES, Direct3D, Stage3D, and the like. According to an embodiment of the present invention, the composition module 416 may perform the composition by using a graphic processing unit (GPU).

The composition module 416 may be allocated with a frame buffer from the buffer managing module 412 (for example, in a dequeueBuffer scheme). The composition module 416 may compose an image in the allocated frame buffer. The operation of the composition module 416 may be varied depending on whether a target layer is present or not. When the target layer is present, the composition module 416 may combine (for example, in a memory copy scheme) the graphic buffer having an image, which is drawn therein by at least one non-target layer, with a frame buffer having an image which is drawn therein by the target layer. In this case, since the target layer has no buffer allocated thereto, the composition module 416 may skip the composition process of the graphic buffer for the target layer. When the target layer is absent, the composition module 416 may combine a graphic buffer, which has an image drawn therein by each non-target layer in the composition standby state, with the frame buffer.

The composition module 416 may transmit, to the display controller 420, information on the frame buffer completely subject to the composition. The display controller 420 may set the frame buffer associated with the received information to a first frame buffer and may set a frame buffer, which is previously provided, to a second frame buffer. According to various embodiments of the present invention, the display controller 420 may use a double buffering scheme employing two buffers, a triple buffering scheme employing three buffers, or a scheme employing four or more buffers as described above.

The display controller 420 may fetch an image in the frame buffer to a DMA in response to every vsync such that the image may be transmitted the display panel 430 mechanically connected with the display controller 420. The interface mechanically connecting the display controller 420 with the display panel 430 may include, for example, an MIPI-DSI, HDMI, embedded display port (eDP), or the like. The display controller 420 may package the image in the frame buffer to be matched with a protocol of each interface and may transmit the packaged image to the display panel 430.

GPU composition increases current consumption and degrades the whole graphic performance. Accordingly, if a target layer performs drawing for the graphic buffer and then the graphic buffer is combined with the frame buffer, the above-problem may be caused. Accordingly, according to various embodiments of the present invention, to solve the problem, the target layer performs drawing for the frame buffer at the initial stage, thereby minimizing GPU composition.

FIG. 5 is a table illustrating composition case based on the states of a first layer and a second layer, according to various embodiments of the present invention.

As described above, the composition module 416 is triggered in the period of vsync of the display to determine whether a graphic buffer in a composition standby state is present in the buffer managing module 412. If there is absent the graphic buffer in the composition standby state, the composition module 416 may not perform composition. If there is present the graphic buffer in the composition standby state, the composition module 416 may perform composition.

Referring to FIG. 5, the states of the first layer 401 and the second layer 402 may be one of "Drawing", "Queued", or "No change". For example, the state of "Drawing" may be a state that an application or a layer draws an image into a buffer. In addition, the state of "Queued" may be a state that an application or a layer completes the drawing into the buffer (or the composition standby state of the buffer completely subject to the drawing). In addition, the state of "No change" may be a state that there is absent change in an image.

According to various embodiments of the present disclosure, the first layer 401 may be a target layer and the second layer 402 may be a non-target layer. When the first layer 401 is in the state of "Queued", and the second layer 402 is in the state of "Queued", a first composition case may be applied. In other words, the first layer 401 may be allocated with a frame buffer and finish image drawing, and the second layer 402 may be allocated with a graphic buffer and finish image drawing. When the first layer 401 is in the state of "Queued", and the second layer 402 is in the state of "No change", a second composition case may be applied. When the first layer 401 is in the state of "No change", and the second layer 402 is in the state of "Queued", a third composition case may be applied. When the first layer 401 is in the state of "Drawing", and the second layer 402 is in the state of "Queued", a fourth composition case may be applied. In addition, when the first layer 401 is in the state of "No change", and the second layer 402 is in the state of "No change" or "Drawing", any composition may not be performed. In addition, when the first layer 401 is in the state of "Drawing", and the second layer 402 is in the state of "No change" or "Drawing", any composition may not be performed. Various composition cases illustrated in FIG. 5 will be described in detail with reference to FIG. 6.

According to an embodiment described above, the layer select module 414 may select a layer having a higher update frequency of an image as a target layer, and may select a layer having a lower update frequency of an image as a non-target layer. In other words, the first layer serving as the target layer may be relatively frequently in the state of "Queued", and the second layer serving as the non-target layer may be relatively less in the state of "Queued". According to an embodiment, the first composition case, in which both the first layer and the second layer are in the state of "Queued", has an occurrence frequency lower than that of the second composition case. In addition, the third composition case, in which the first layer is in the state of "No change" or "Drawing" not requiring composition, but only the second layer is in the state of "Queued" requiring composition, has an occurrence frequency lower than that of the second composition case. In addition, the second composition case, in which only the first layer is in the state of "Queued", has the occurrence frequency higher than that of the first or third composition case.

Conventionally, when any one of the first layer 401 or the second layer 402 becomes in the state of "Queued", the composition module 416 performs the composition operation for a plurality of layer buffers by using the graphic library 419. According to an embodiment, even if the first layer 401 serving as the target layer is in the state of "Queued", if the second layer 402 serving as the non-target layer is in the state of "No change" or "Drawing" not requiring composition, the composition module 416 may not perform the composition operation, which is to be performed using the graphic library 419, with respect to the first layer 401. For example, when the frame region of the non-target layer and the frame region of the target layer are not overlapped with each other, even if the composition module 416 does not perform the composition operation, which is to be performed using the graphic library 419, the application may draw an image corresponding to the target layer in the frame buffer, thereby creating the final image. However, when the frame region of the non-target layer is overlapped with the frame region of the target layer, the frame region of the non-target layer may be changed by the image drawn by the application. Accordingly, even if the non-target layer is in the state not requiring the composition, the composition operation by the composition module 416 may be performed.

Each layer illustrated in FIG. 5 may be allocated with a plurality of buffers (or two buffers or three buffers) in a multiple-buffering scheme. The state of the buffer illustrated in FIG. 5 may represent the state of a buffer, which is currently used or is to be used, in a plurality of buffers.

Figure 6A:
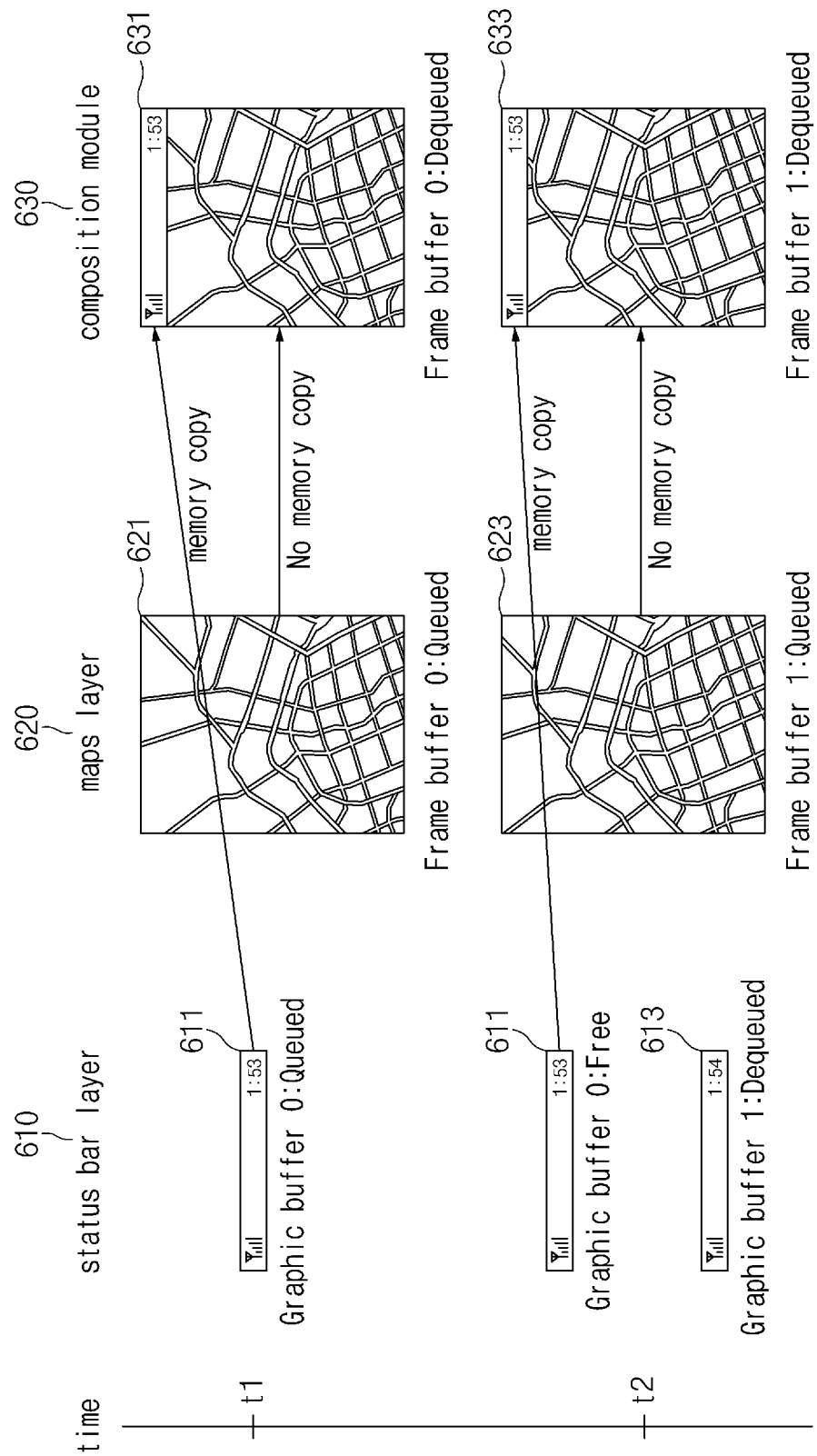
FIGS. 6A and 6B are views illustrating various composition cases with time, according to various embodiments of the present invention.
Figure 6B:
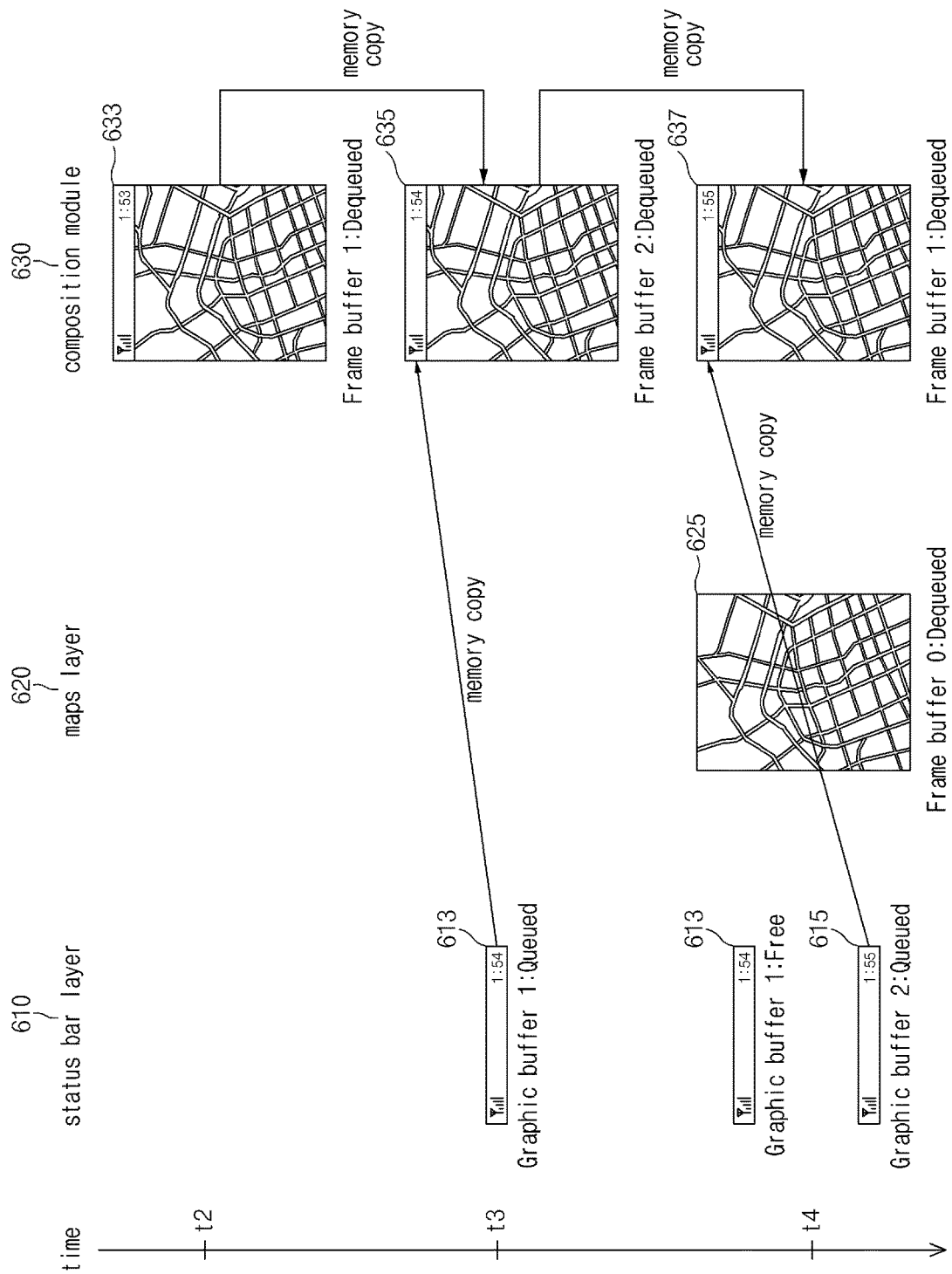

FIGS. 6A and 6B are views illustrating various composition cases with time, according to various embodiments of the present invention.

Referring to FIGS. 6A and 6B, a composition module 630 (e.g., the composition module 416 of FIG. 4) may combine images, which are drawn by a status bar layer 610 and drawn by a maps layer 620 respectively, in a frame buffer. According to various embodiments of the present invention, the status bar layer 610 is a non-target layer (e.g., the second layer of FIG. 5), and the maps layer 620 may be a target layer (e.g., the first layer of FIG. 5).

A first time t1 of FIG. 6A may correspond to the first composition case of FIG. 5. The first composition case may indicate the state of "Queued" that the target layer (e.g., the maps layer 620) and the non-target layer (e.g., the status bar layer 610) have finished drawings in the buffers allocated to the target layer and the non-target layer, respectively, and return the relevant buffers to the buffer managing module. For example, the status bar layer 610 may be in the state that a first status bar image 611 has been completely drawn (queued) in a first graphic buffer (graphic buffer 0). For example, the maps layer 620 may be in the state that a first map image 621 has been completely drawn in a first frame buffer (frame buffer 0) (queued). The composition module 630 may create a first composition image 631 obtained by combining the first status bar image 611 with the first map image 621 drawn in the first frame buffer (frame buffer 0).

A second time t2 of FIG. 6A may correspond to the second composition case of FIG. 5. The second composition case may indicate the state that the target layer (e.g., the maps layer 620) has finished drawing and the non-target layer (e.g., the status bar layer 610) does not perform drawing since an image is not updated or is in the state of performing a drawing. For example, the status bar layer 610 may be in the state of performing the drawing of a second status bar image 613 in the second graphic buffer (graphic buffer 1) (dequeued), and the maps layer 620 may be in the state that a second maps image 623 has been completely drawn in the second frame buffer (frame buffer 1) (queued). In other words, the status bar image and the maps image are updated between the first time t1 and the second time t2. At the second time t2, the status bar layer 610 is performing the drawing of the second status bar image 613 in the second graphic buffer (graphic buffer 1) and the maps layer 620 has completely performed the drawing of the second maps image 623 in the second frame buffer (frame buffer 1). Since the composition module 630 may not combine the second status bar image 613 in the state that the second status bar image 613 is being drawn in the second graphic buffer (graphic buffer 1), the composition module 630 may create a second composition image 633 by combining the first status bar image 611 drawn in the first graphic buffer (graphic buffer 0) with the second maps image 623 in the second frame buffer (frame buffer 1). According to various embodiments of the present invention, since the target layer may be determined based on the update frequency of an image, the second composition case that the image is updated only with respect to the target layer under the general use environment of a user may most frequently occurs.

According to the second composition case, since the second maps image 623 is created only in the frame buffer, image copy may be performed only with respect to the first status bar image 611 drawn in the first graphic buffer (graphic buffer 0) in the procedure of creating the second composition image 633. That is to say, in the second composition case which most frequently occurs, a memory copying process may be minimized to reduce current consumption, so graphic performance may be improved.

A third time t3 of FIG. 6B may correspond to the third composition case of FIG. 5. The third composition case may indicate the state that the target layer (e.g., the maps layer 620) does not perform drawing since there is no image update, and the non-target layer (e.g., the status bar layer 610) has finished drawing. For example, the status bar layer 610 is in the state that the second status bar image 613 has completely drawn in the second graphic buffer (graphic buffer 1) (queued) and the maps layer 620 may be in the state that there is no image update. In other words, as the status bar image is updated between the first time t1 and the second time t2, the status bar layer 610 may complete the drawing of the second status bar image 613 into the second graphic buffer (graphic buffer 1) between the second time t2 and the third time t3. The composition module 630 may copy the second maps image 623, which has been drawn in the second frame buffer (frame buffer 1), into the third frame buffer (frame buffer 2) and may compose the second status bar image 613, which is drawn in the second graphic buffer (graphic buffer 1), into the third frame buffer (frame buffer 1) in which the second maps image 623 is drawn, thereby creating a third composition image 635.

A fourth time t4 of FIG. 6B may correspond to the fourth composition case of FIG. 5. The fourth composition case may indicate the state that the target layer (e.g., the maps layer 620) performs drawing and the non-target layer (e.g., the status bar layer 610) has finished drawing. For example, the status bar layer 610 has completed the drawing of a third status bar image 615 into the third graphic buffer (graphic buffer 2) and the maps layer 620 may be performing the drawing of a third maps image 625 into the first frame buffer (frame buffer 0). In other words, the status bar image and the maps image are updated between the third time t3 and the fourth time t4. At the fourth time t4, the status bar layer 610 has finished the drawing of the third status bar image 615 into the third graphic buffer (graphic buffer 2) and the maps layer 620 is performing the drawing of the third maps image 625 into the first frame buffer (frame buffer 0). The composition module 630 may copy the second maps image 623, which has been drawn in the third frame buffer (frame buffer 2), into the second frame buffer (frame buffer 1) and may combine the third status bar image 615, which is drawn in the third graphic buffer (graphic buffer 2), with the second maps image 623 in the second frame buffer (frame buffer 1), thereby creating a fourth composition image 637.

Although the operation performed in the triple buffer scheme has been described in the embodiment with reference to FIGS. 6A and 6B, there is no limitation in the number of buffers allocated to a layer in the present invention. In addition, the present invention may be applied even to a double buffer scheme or a scheme of allocating four or more buffers to one layer.

Figure 7:
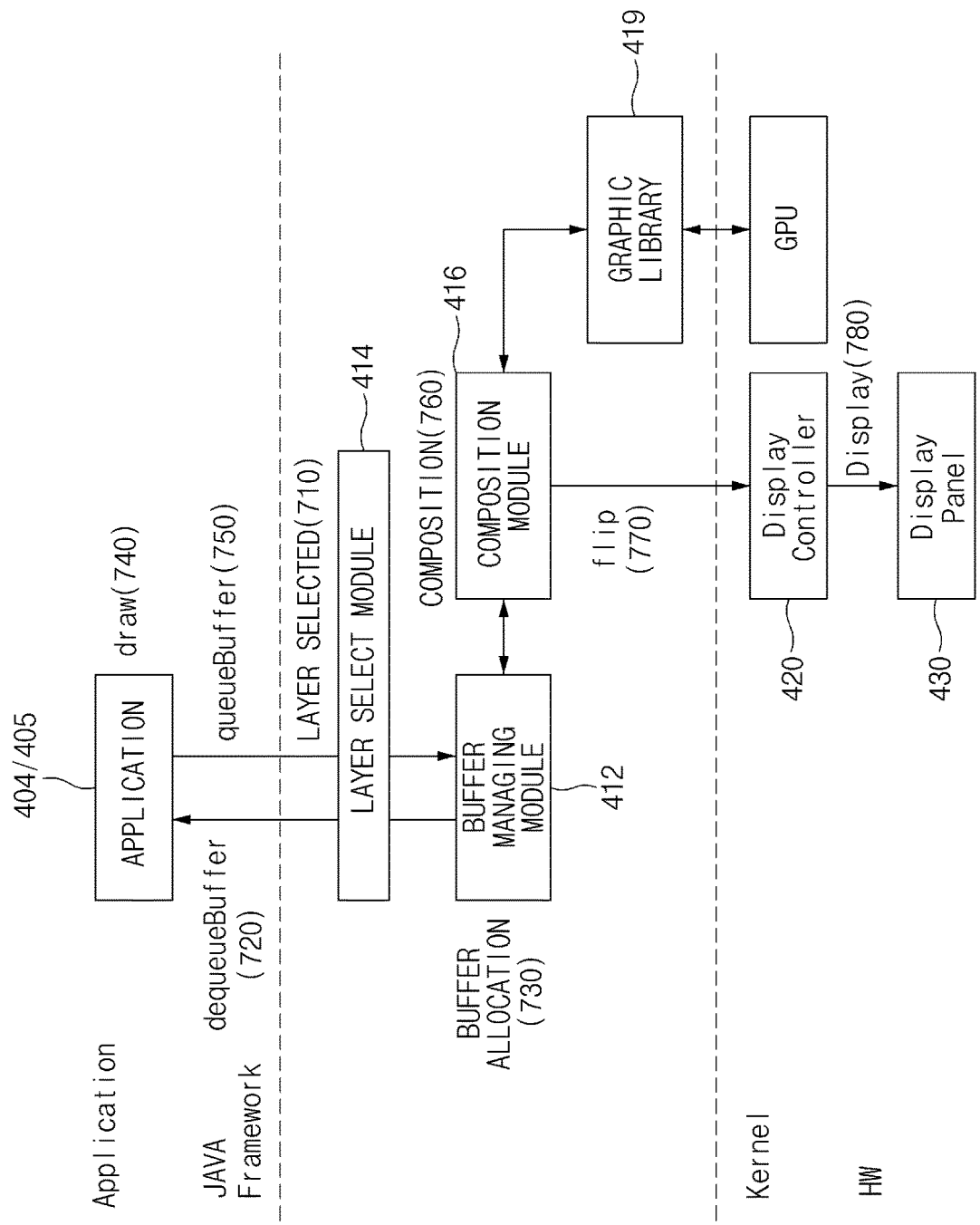
FIG. 7 is a view illustrating each of components of the electronic device and the operation performed by each component, according to various embodiments of the present invention.

FIG. 7 is a view illustrating each of components of the electronic device and the operation performed by each component, according to various embodiments of the present invention.

In operation 710, the layer select module 414 may select a target layer from a plurality of layers (e.g., the first layer 401 to the third layer 403 of FIG. 4) created to correspond to at least one application (e.g., the first application 404 and the second application 405 of FIG. 4).

According to various embodiments of the present invention, operation 710 may be performed as information on a layer list managed by the layer manager module 418 is changed. For example, when applications change screen configuration, the layer manager module 418 may change layer information corresponding to a change in the screen configuration. Accordingly, the layer select module 414 may set (or re-set) or release the target layer.

In operation 720, at least one application (or a layer) may request the buffer managing module 412 to allocate a buffer. For example, the application (or the layer) may request the buffer managing module 412 to allocate a buffer in a calling scheme of "dequeueBuffer"

In operation 730, the buffer managing module 412 may allocate a partial region of a frame buffer to a target layer corresponding to operation 720 and may allocate a graphic buffer to a non-target layer. The buffer managing module 412 may transmit the information on the graphic buffer or the frame buffer to the application (or the layer) which has requested the buffer, in response to the call of "dequeueBuffer".

In operation 740, the application (e.g., the first application 404 and the second application 405 of FIG. 4) may draw an image to a buffer corresponding to an address received in operation 730.

In operation 750, the application may transmit the image (or the address of the buffer having the image drawn therein), which is drawn in operation 740, to the composition module 416 through the buffer managing module 412. For example, the application (or the layer) may send the buffer to the buffer managing module 412 in a calling scheme of "queueBuffer". Accordingly, the buffer managing module 412 and the composition module 416 may determine that the buffer becomes in the composition standby state.

In operation 760, the composition module 416 may compose an image by copying the graphic buffer to the frame buffer through a memory copying process. The composition module 416 may perform the composition by using the graphic library 419. In this case, the graphic library 419 may use the GPU. The composition in operation 760 may be, for example, GPU composition.

According to various embodiments of the present invention, since a target layer may be determined based on the update frequency of an image, a composition case (e.g., the second composition case of FIG. 5) that the image has been updated only with respect to the target layer may most frequently occur under the general use environment of a user. The image corresponding to the target layer is created only in the frame buffer. Accordingly, in the image composition procedure, the memory copying process is minimized to reduce current consumption so graphic performance may be improved.

In operation 770, the composition module 416 may transmit, to the display controller 420, the image (or the address of the frame buffer) composed in operation 760. The transmission in operation 770 may be performed in a flip scheme employing at least two buffers.

In operation 780, the display controller 420 may provide the image, which is received in operation 770, through the display panel 430.

Figure 8:
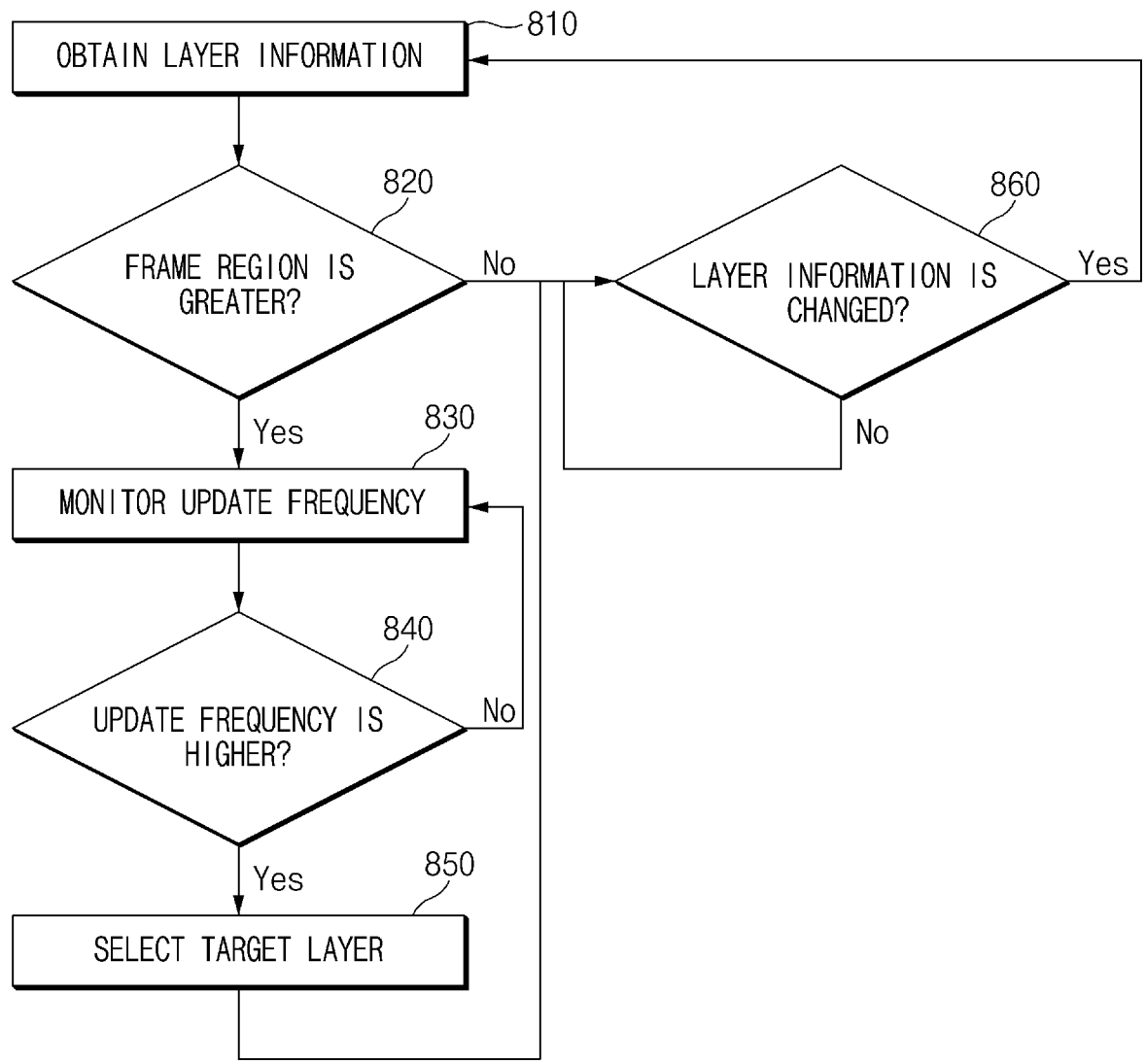
FIG. 8 is a flowchart illustrating a method that a layer select module selects a target layer, according to various embodiments of the present invention.

FIG. 8 is a flowchart illustrating a method that a layer select module selects a target layer, according to various embodiments of the present invention.

In operation 810, the layer manager module 418 may obtain information on a plurality of layers corresponding to an application which is running. The layer select module 414 may refer to the information on the plurality of layers managed by the layer manager module 418.

In operation 820, the layer select module 414 may determine the size of a frame region by referring to the information on the plurality of layers from the layer manager module 418. If the size of the frame region is equal to or greater than a threshold value, operation 830 may be performed after operation 820. Otherwise, operation 860 may be performed. According to an embodiment, the layer select module 414 may select a target layer based on the size of the frame region when selecting the target layer from the plurality of layers. For example, the layer select module 414 may select, as the target layer, a layer, which has the largest screen region, from the plurality of layers executed on screens.

In operation 830, the layer select module 414 may monitor an update frequency of an image of at least one of the layers. For example, the layer select module 414 may recognize the update frequency of the image of the layer in a scheme of measuring the frequency that the queueBuffer 750 occurs in the buffer managing module 412. According to an embodiment, the layer select module 414 may monitor an update frequency of an image of a layer having a frame region in size equal to or greater than a threshold value.

In operation 850, the layer select module 414 may select the target layer. According to an embodiment, the layer select module 414 may select, as a target layer, a layer, which has the higher update frequency of an image, from layers having frame regions in size equal to or greater than the threshold value. According to an embodiment, operation 820 may be omitted in the procedure of selecting the target layer. In other words, the layer select module 414 may select the target layer based on the update frequency of the image regardless of the size of the frame region. For example, the layer select module 414 may select, as the target layer, the highest update frequency of an image.

Operation 830 is performed with respect to the lower update frequency of the image depending on the determination in operation 840, so the layer select module 414 may periodically monitor the update frequency of the image.

In operation 860, the layer manager module 418 may determine whether layer information is changed. When the layer information is changed, for example, another application may be executed, a notification may occur, an application, which is running, may be terminated, or the shifting to a home screen may be made. According to an embodiment, when the layer information is changed in operation 860, operation 810 to operation 850 are repeated to select a new target layer or not. According to an embodiment, when the target layer is not determined in the procedure of FIG. 8, all layers belonging to the layer manager module 418 may operate as non-target layers.

Figure 9:
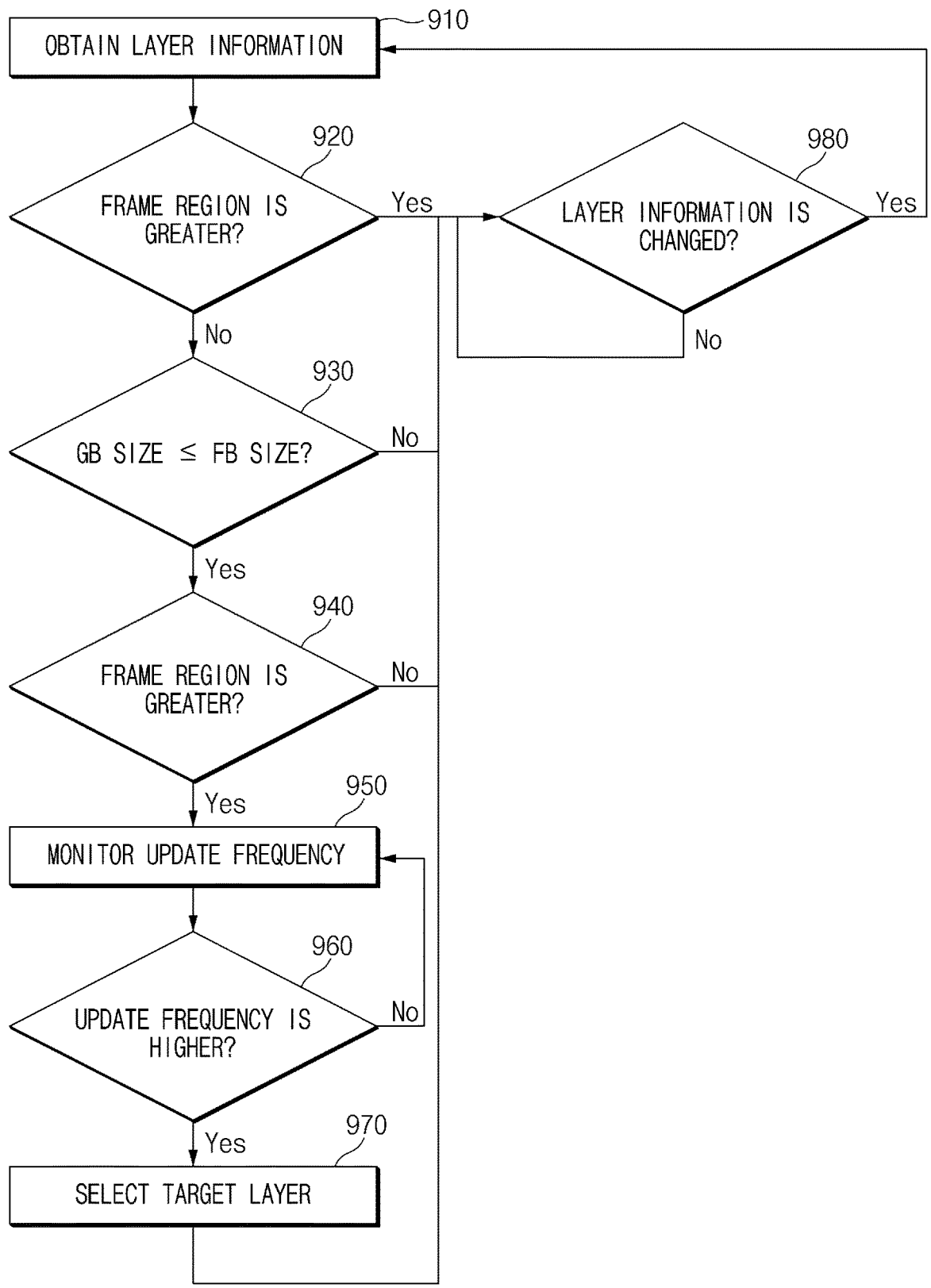
FIG. 9 is a flowchart illustrating a method that a layer select module selects a target layer, according to various embodiments of the present invention.

FIG. 9 is a flowchart illustrating a method that the layer select module selects a target layer, according to various embodiments of the present invention.

In operation 910, the layer select module 414 may obtain information on a plurality of layers corresponding to an application which is running.

In operation 920, the layer select module 414 may determine whether the frame regions of layers are overlapped with each other. When the frame regions are overlapped with other, operation 980 may be performed after operation 920. Otherwise, operation 930 may be performed.

In operation 930, the layer select module 414 may compare the size of the buffer (e.g., the graphic buffer) requested by an application (or a layer) with the size of the frame buffer. For example, the layer select module 414 may compare the regions, which allow image drawing, belonging to the requested graphic buffer and the frame buffer. According to an embodiment, if the size of the graphic buffer is equal to or less than the size of the frame buffer, operation 940 may be performed. Otherwise, operation 980 may be performed. If the size of the graphic buffer requested by the application is greater than the frame buffer, an entire portion of the image may not be drawn in the frame buffer. According to another embodiment, when the layer select module 414 may proceed to operation 940 if the size of the graphic buffer is equal to the size of the frame buffer. Otherwise, the layer select module 414 may proceed to operation 980. If the size of the graphic buffer is different from the size of the frame buffer, since an offset needs to be matched, the composition is not easily performed.

In operation 940, the layer select module 414 may determine the size of the frame region. If the size of the frame region is equal to or greater than a threshold value, operation 950 may be performed after operation 940. Otherwise, operation 980 may be performed.

According to an embodiment, the layer select module 414 may monitor the update frequency of an image with respect to a layer having a frame region in size equal to or greater than a threshold value in operation 950.

According to an embodiment, in operation 970, the layer select module 414 may select, as a target layer, a layer, which has the higher update frequency of an image in operation 960, from layers having frame regions in size which is equal to or greater than the threshold value depending on the determination in operation 940.

Operation 950 is performed with respect to the lower update frequency of the image depending on the determination in operation 960, so the layer select module 414 may periodically monitor the update frequency.

In operation 980, the layer select module 414 may determine whether layer information is changed. When the layer information is changed, for example, another application may be executed, a notification may occur, an application, which is running, may be terminated, or the shifting to a home screen may be made.

According to an embodiment, one of operation 920 and operation 930 may be omitted in the procedure of selecting the target layer. In other words, the layer select module 414 may select a target layer regardless of whether the frame regions are overlapped with each other or regardless of the size of the graphic buffer and the size of the frame buffer.

Figure 10:
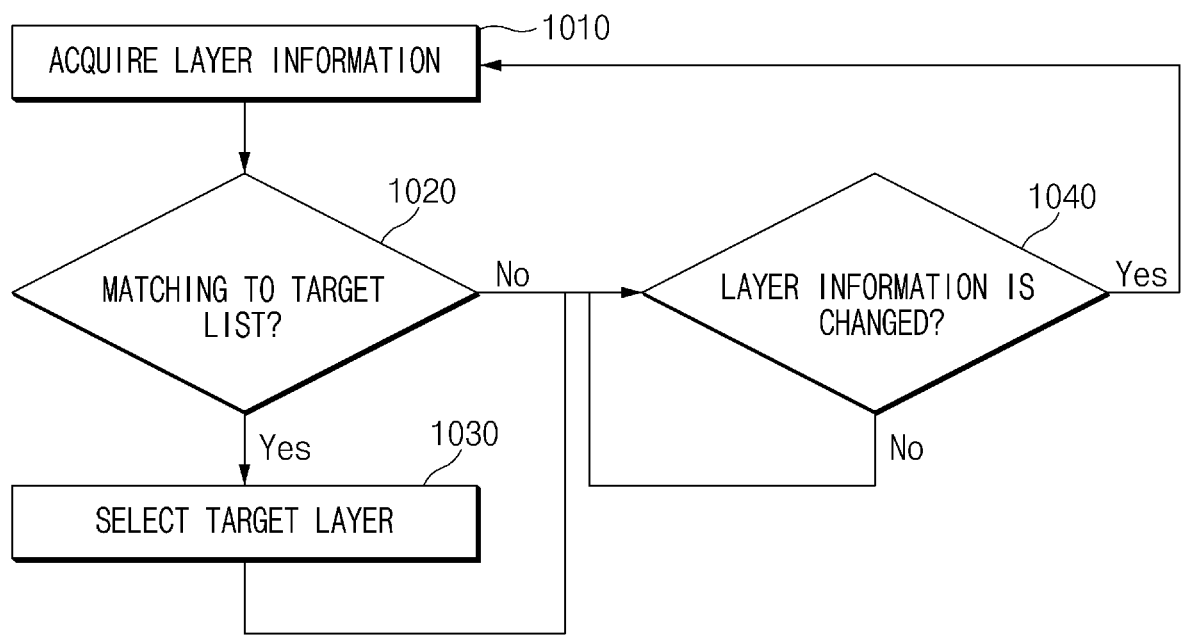
FIG. 10 is a flowchart illustrating a method that a layer select module selects a target layer, according to various embodiments of the present invention.

FIG. 10 is a flowchart illustrating a method that the layer select module selects a target layer, according to various embodiments of the present invention.

In operation 1010, the windows compositor 410 (e.g., the layer select module 414) may obtain information on a plurality of layers corresponding to an application which is running.

In operation 1020, the layer select module 414 may determine whether a layer included in a preset target layer list is present in the plurality of layers. The layer included in the target layer list may be selected as the target layer in operation 1030. When the layer included in the target layer list is absent from the plurality of layers, operation 1040 may be performed. For example, according to various embodiments, the preset target layer list may include a layer corresponding to at least a partial screen (e.g., a web-browsing screen) of a web-browser application, a layer corresponding to at least a partial screen (e.g., a maps screen) of a maps application, a layer corresponding to at least a partial screen (e.g., a moving picture screen) of a moving picture player, a layer corresponding to a preview screen of a camera application, and the like. According to various embodiments, a layer corresponding to a statusbar screen region of a screen may not be included in the preset target layer list.

In operation 1040, the windows compositor 410 (e.g. the layer select module 414) may determine whether layer information is changed. When the layer information is changed, for example, another application may be executed, a notification may occur, an application, which is running, may be terminated, or the shifting to a home screen may be made.

Figure 11:
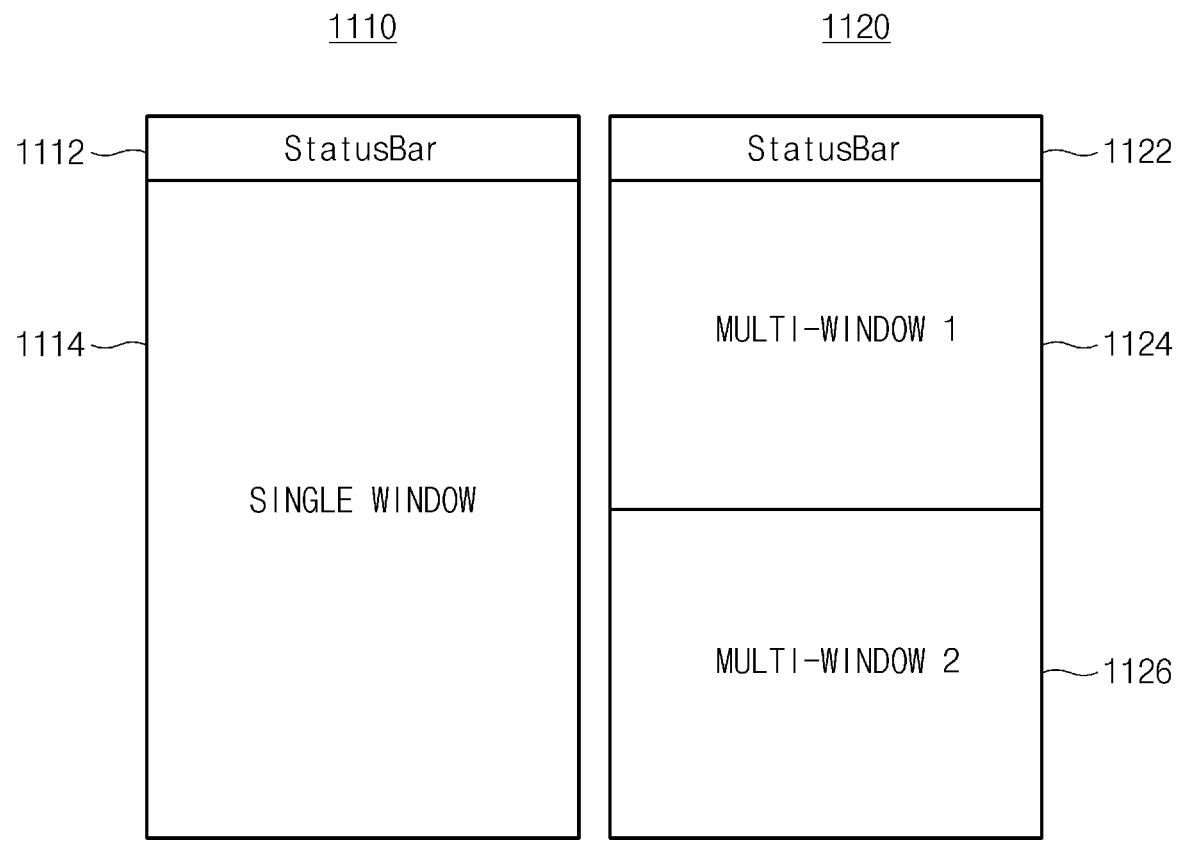
FIG. 11 illustrates the difference between a single window and a multi-window when selecting a target layer, according to various embodiments of the present invention.

FIG. 11 illustrates the difference between a single window and a multi-window when selecting a target layer, according to various embodiments of the present invention.

Referring to a drawing 1110 at the left side of FIG. 11, an electronic device may display a status bar 1112 and a single window 1114 (for example, one execution screen of an application).

Referring to a drawing 1120 at the right side of FIG. 11, the electronic device may display a status bar 1122 and multiple windows (a first multi-window 1124 and a second multi-window 1126), for example, an execution screen of a first application and an execution screen of a second application.

In the drawing 1110, the layer select module 414 may select, as a target layer, a layer of the single window 1114 since the layer size of the single window 1114 is greater than the layer size of the status bar 1112 and is equal to or greater than a threshold value.

In a drawing 1120, since the layer sizes of the first multi-window 1124 and the second multi-window 1126 is greater than the layer size of the status bar 1112 and is equal to or greater than the threshold value, the layer select module (e.g., reference numeral 414 of FIG. 4) may determine whether a layer included in the preset target layer list is present in layers of the first multi-window 1124 and the second multi-window 1126 or may monitor an update frequency of an image for each layer, and thus may select one layer as a target layer.

Figure 12:
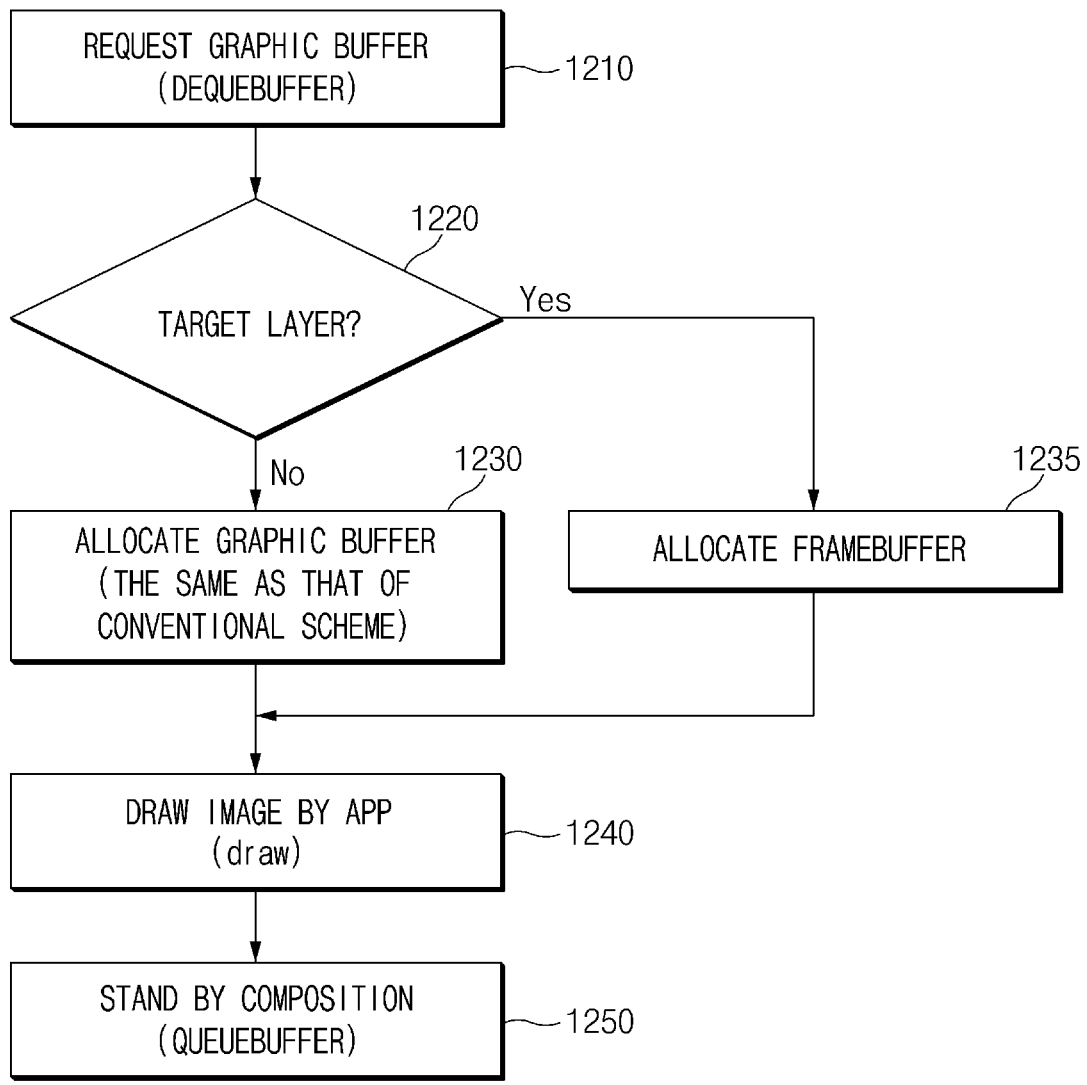
FIG. 12 is a view illustrating a method of performing drawing to a graphic buffer or a frame buffer, according to various embodiments of the present invention.

FIG. 12 is a view illustrating a method of performing drawing in a graphic buffer or a frame buffer, according to various embodiments of the present invention.

In operation 1210, an application may request the windows compositor 410 to allocate a graphic buffer corresponding to a layer (e.g., the first layer 401, the second layer 402, or the third layer 403 of FIG. 4) of the application.

In operation 1220, the windows compositor 410 (e.g., the buffer managing module 412) may determine whether the layer which has requested the graphic buffer in operation 1210 is a target layer. If the layer is a non-target layer, the windows compositor 410 (e.g., the buffer managing module 412) may allocate the graphic buffer to the layer in operation 1230. If the layer is a target layer, the windows compositor 410 (e.g., the buffer managing module 412) may allocate a frame buffer to the layer in operation 1235.

In operation 1240, the application may perform drawing to the buffer (the graphic buffer or the frame buffer) allocated in operation 1230 or operation 1235.

In operation 1250, the application may notify the windows compositor 410 of that the drawing in the buffer has been finished, in a scheme of calling queueBuffer of sending a buffer to the buffer managing module 412. The buffer managing module 412 may store the buffer subject to the drawing in operation 1240 in the composition standby state.

Figure 13:
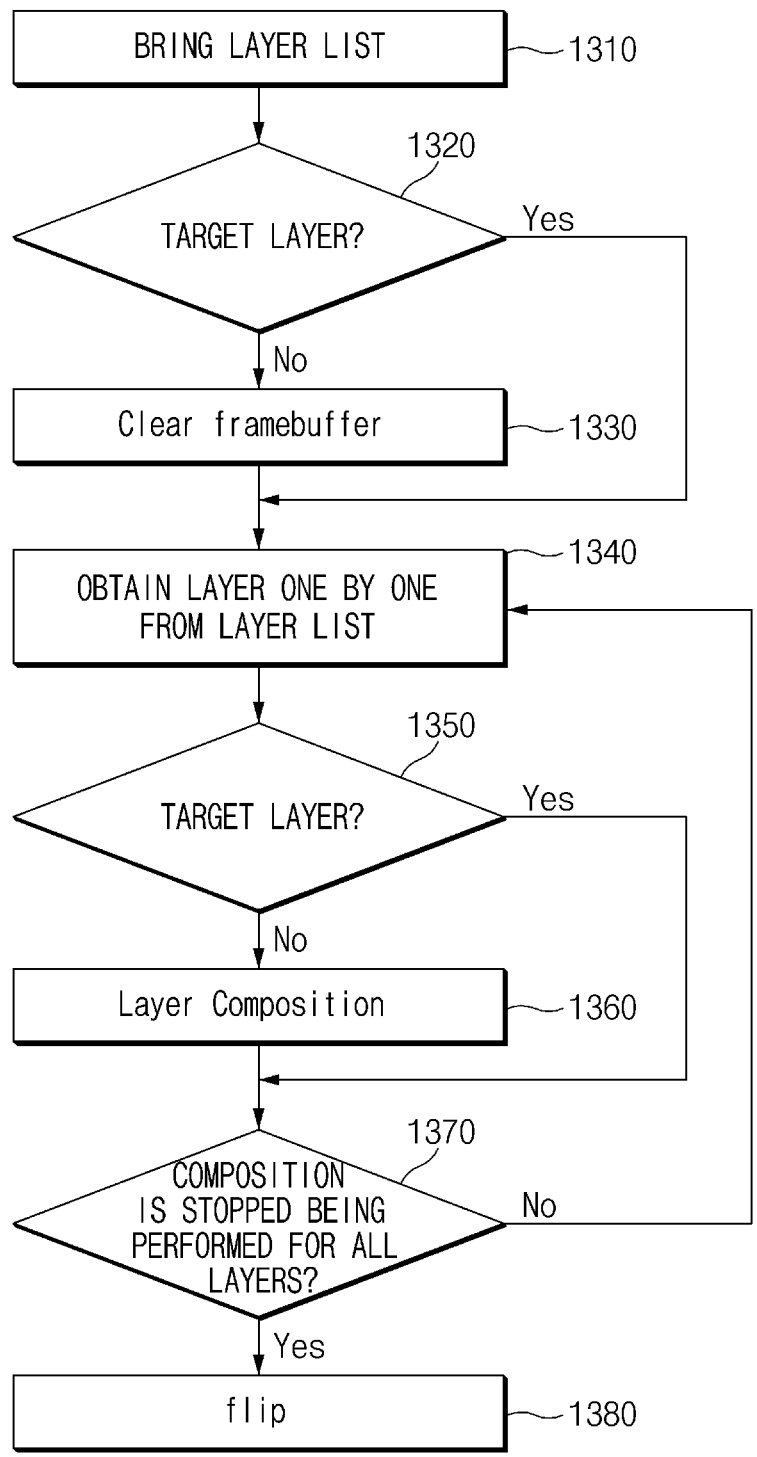
FIG. 13 is a view illustrating a method of performing composition with respect to a graphic buffer and/or a frame buffer, according to various embodiments of the present invention.

FIG. 13 is a view illustrating a method of performing composition with respect to a graphic buffer and/or a frame buffer, according to various embodiments of the present invention.

In operation 1310, the composition module 416 may search for a layer list indicating all layers executed in the electronic device.

In operation 1320, the composition module 416 may determine whether a layer selected as a target layer by the layer select module 414 is present in layers included in the layer list. If the target layer is absent, operation 1330 may be performed. If the target layer is present, operation 1340 may be performed.

In operation 1330, the composition module 416 may initialize (clear) the frame buffer to be, for example, in black. If the target layer is present, since the target layer performs the drawing in the frame buffer, operation 1330 may not be performed.

In operation 1340, the composition module 416 may select one layer for composition sequentially, for example, in the z-order.

In operation 1350, the composition module 416 may determine whether the layer selected in operation 1340 is the target layer. If the layer selected in operation 1340 is the non-target layer, operation 1360 may be performed.

In operation 1360, the composition module 416 may combine an image of the layer selected in operation 1340 with an image of the frame buffer. When the selected layer is the target layer in operation 1340, since the target layer performs drawing in the frame buffer, the operation 1360 may not be performed.

In operation 1370, the composition module 416 may determine whether composition with respect to all layers in the list searched in operation 1310 is performed. If the composition is performed with respect to all layers, in operation 1380, the composition module 416 may transmit the frame buffer to the display controller 420.

If the composition is not performed with respect to all layers, operation 1340 may be performed and the composition module 416 may perform the composition for a layer which is not subject to the composition.

Figure 14:
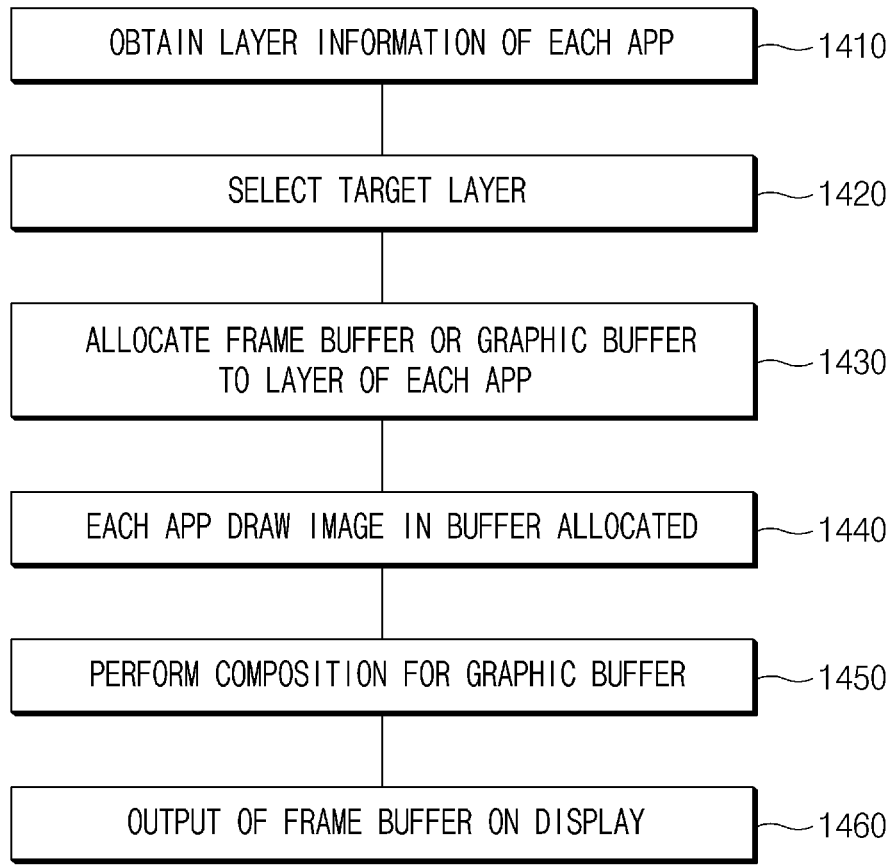
FIG. 14 is a flowchart illustrating a method of outputting an application screen, according to various embodiments of the present invention.

FIG. 14 is a flowchart illustrating a method of outputting an application screen, according to various embodiments of the present invention.

In operation 1410, the windows compositor 410 (e.g., the layer select module 414) may obtain information on at least one layer corresponding to an application which is running.

In operation 1420, the layer select module 414 may select the target layer from at least one layer corresponding to the application which is running. According to an embodiment, the target layer may refer to a layer allocated with at least a partial region of a memory space allocated to the frame buffer without being allocated with a memory space provided separately from the frame buffer when a graphic buffer, which is to be used by the layer, is allocated.

According to an embodiment, in various methods of implementing the present invention, program codes may not be written by expressly distinguishing between a target layer and a non-target layer. However, the layers may be conceptually classified into a target layer and a non-target layer depending on manners that the layers are allocated with buffers.

In operation 1430, the buffer managing module 412 may allocate a frame buffer or a graphic buffer to a layer of each application. For example, the frame buffer may be allocated to a layer selected as the target layer in operation 1420 and a graphic buffer may be allocated to a non-target layer.

In operation 1440, each layer may draw an image in a buffer allocated in operation 1430.

In operation 1450, the composition module 416 may perform a composition by copying graphic buffers having an image drawn therein to the frame buffer having an image drawn therein in a memory copying scheme.

In operation 1460, the composition module 416 may output an image of the frame buffer to the display panel 430 through the display controller 420.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added. While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a graphic buffer configured to store graphic information received from an application;
a frame buffer configured to store graphic information to be displayed on a display; and
a processor,
wherein the processor is configured to:
store, in the graphic buffer, first graphic information received from a first layer corresponding to the application;
store, in the frame buffer, second graphic information received from a second layer corresponding to the application or a different application when an update frequency of the second graphic information is greater than or equal to a specified value;
store, in the frame buffer, the first graphic information stored in the graphic buffer; and
simultaneously display the first graphic information and the second graphic information, which are stored in the frame buffer, through the display operatively connected with the processor,
wherein the second layer has the update frequency of equal to or higher than the specified frequency is determined as a target layer, and
wherein the target layer is a layer associated with an image to be directly transmitted to the frame buffer.

2. The electronic device of claim 1, wherein the processor is configured to:
perform an operation of storing the second graphic information in the frame buffer, when an image size of the second layer is equal to or greater than a specified size.

3. The electronic device of claim 1, wherein the processor is configured to:
perform an operation of storing the second graphic information in the frame buffer when a size of a buffer requested corresponding to the second layer is equal to or less than a size of the frame buffer.

4. The electronic device of claim 1, wherein the processor is configured to:
perform an operation of storing the second graphic information in the frame buffer when there is absent a region in which an image of the first graphic information and an image of the second graphic information are overlapped with each other.

5. The electronic device of claim 1, wherein the processor is configured to:
display the first graphic information stored in the frame buffer on a first region of the display; and
display the second graphic information stored in the frame buffer on a second region of the display.

6. The electronic device of claim 1, wherein the processor is configured to:
store the second graphic information, which is received from the second layer, in the frame buffer without passing through the graphic buffer or another graphic buffer.

7. The electronic device of claim 1, wherein the first layer and the second layer are configured to correspond to one application executed in the processor.

8. The electronic device of claim 1, wherein the first layer and the second layer are configured to correspond to mutually different applications executed in the processor.

9. The electronic device of claim 1, wherein the processor is configured to:
   determine whether to store the first graphic information received from the first layer in the graphic buffer or whether to store the second graphic information received from the second layer in the frame buffer.

10. The electronic device of claim 9, wherein the processor is configured to:
    re-determine whether to store the first graphic information received from the first layer in the graphic buffer or whether to store the second graphic information received from the second layer in the frame buffer, based on execution of a new application.

11. The electronic device of claim 10, wherein the processor is configured to:
    based on adding a third layer,
    determine whether to store third graphic information received from the third layer in the graphic buffer or the frame buffer.

12. A performing method in an electronic device, the method comprising:
    storing first graphic information received from a first layer corresponding to an application in a graphic buffer;
    storing second graphic information received from a second layer corresponding to the application or a different application in a frame buffer;
    storing, in the frame buffer, the first graphic information stored in the graphic buffer; and
    simultaneously displaying the first graphic information and the second graphic information, which are stored in the frame buffer, through a display of the electronic device,
    wherein the storing of the second graphic information in the frame buffer includes:
        determining an update frequency of the second graphic information; and
        storing the second graphic information in the frame buffer when the update frequency is greater than or equal to a specified value,
    wherein the second layer has the update frequency of equal to or higher than the specified frequency is determined as a target layer, and
    wherein the target layer is a layer associated with an image to be directly transmitted to the frame buffer.

* * * * *